Figure 3:
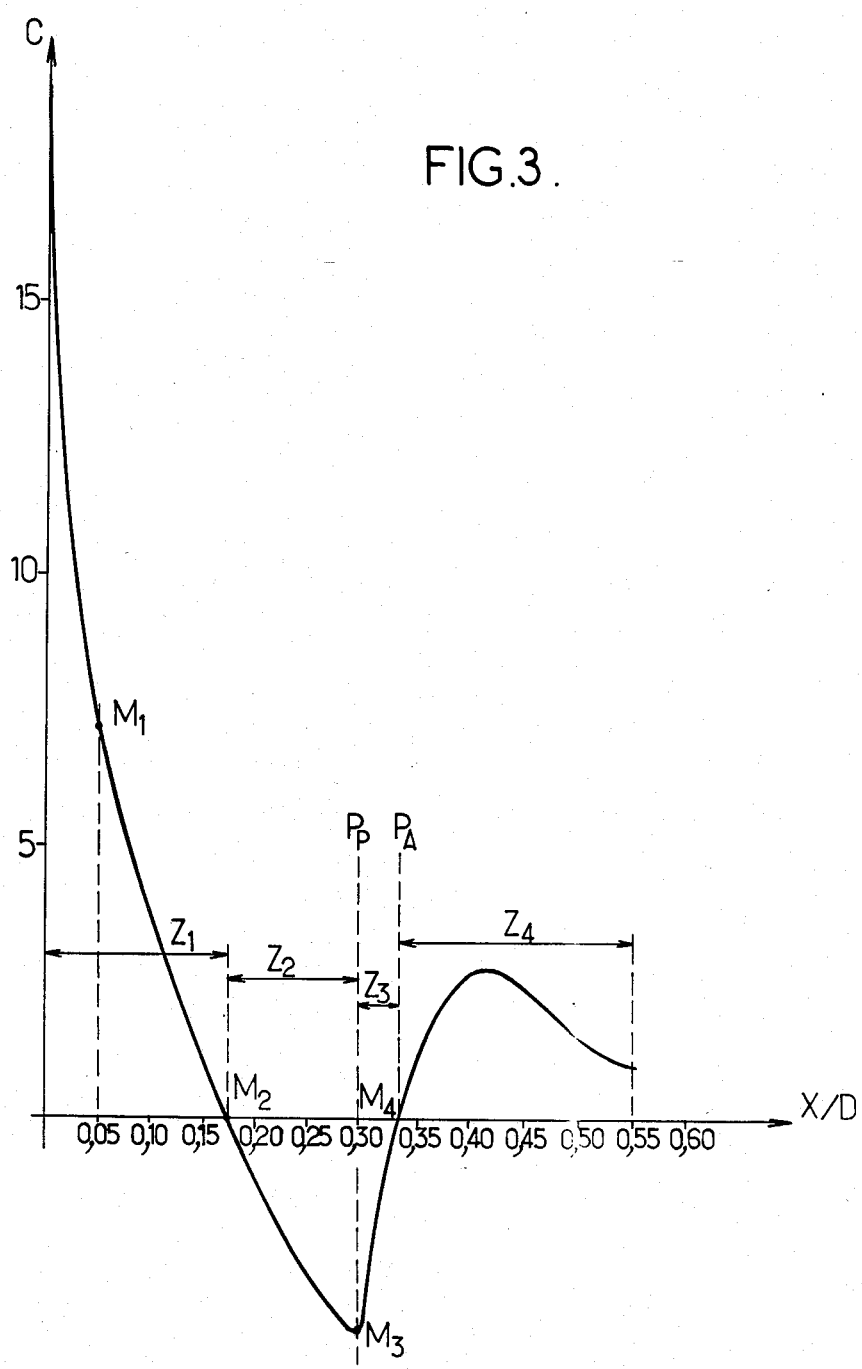

United States Patent [19]

Bousquet et al.

[11] Patent Number: 4,790,725
[45] Date of Patent: Dec. 13, 1988

[54] AERIAL PROPELLERS MORE ESPECIALLY FOR AIRCRAFT PROPULSIVE UNITS

[75] Inventors: Jean-Marc Bousquet, Paris; Alain Faubert, Voisins-le-Bretonneux, both of France

[73] Assignee: Office National d'Etudes et de Recherche Aerospatiales, Chatillon Sous Bagneux, France

[21] Appl. No.: 105,221

[22] Filed: Oct. 7, 1987

[30] Foreign Application Priority Data

Oct. 23, 1986 [FR] France ................... 86 14722

[51] Int. Cl.$^4$ ............................................. B64C 11/14
[52] U.S. Cl. ........................... 416/245 R; 416/DIG. 2
[58] Field of Search ................ 416/223 R, 234, 239, 416/DIG. 2, 245 R, 245 A; 415/181, 215

[56] References Cited

U.S. PATENT DOCUMENTS

| 1,402,539 | 1/1922 | Ross | 416/245 R |
| 1,929,690 | 10/1933 | Huntman | 416/245 R X |
| 2,408,677 | 10/1946 | Owner | 416/245 R X |
| 2,637,403 | 5/1953 | Wallace | 416/239 X |
| 2,924,282 | 2/1960 | Perryman | 416/245 R |
| 2,934,150 | 4/1960 | Fink | 416/245 R X |
| 4,129,984 | 12/1978 | Nelson | 416/245 R X |
| 4,419,053 | 12/1983 | Swearingen, Jr. | 416/239 X |

FOREIGN PATENT DOCUMENTS 172997  12/1921  United Kingdom .............. 416/234

Primary Examiner—Abraham Hershkovitz
Assistant Examiner—Joseph M. Pitko
Attorney, Agent, or Firm—Stevens, Davis, Miller & Mosher

[57] ABSTRACT

The invention provides improvements to aerial propellers, particularly for aircraft propulsive units, wherein the cowling of the propeller is defined by a meridian line having: at its origin (B) a maximum curvature greater than 15; then a curvature decreasing rapidly from the maximum value to a value of 7; then a curvature decreasing linearly from the value 7 to a value of 0; than a curvature decreasing more slowly from the value 0 to a minimum value between −3 and −5; then a curvature increasing rapidly from the minimum value to a value of 0.

4 Claims, 3 Drawing Sheets

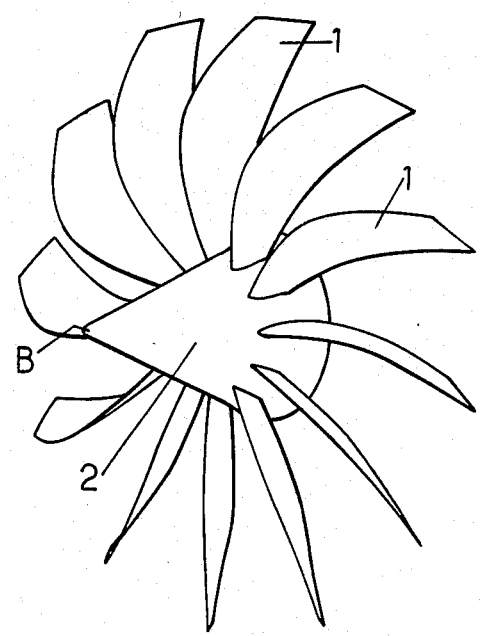
FIG.1. (PRIOR ART)
FIG.2.
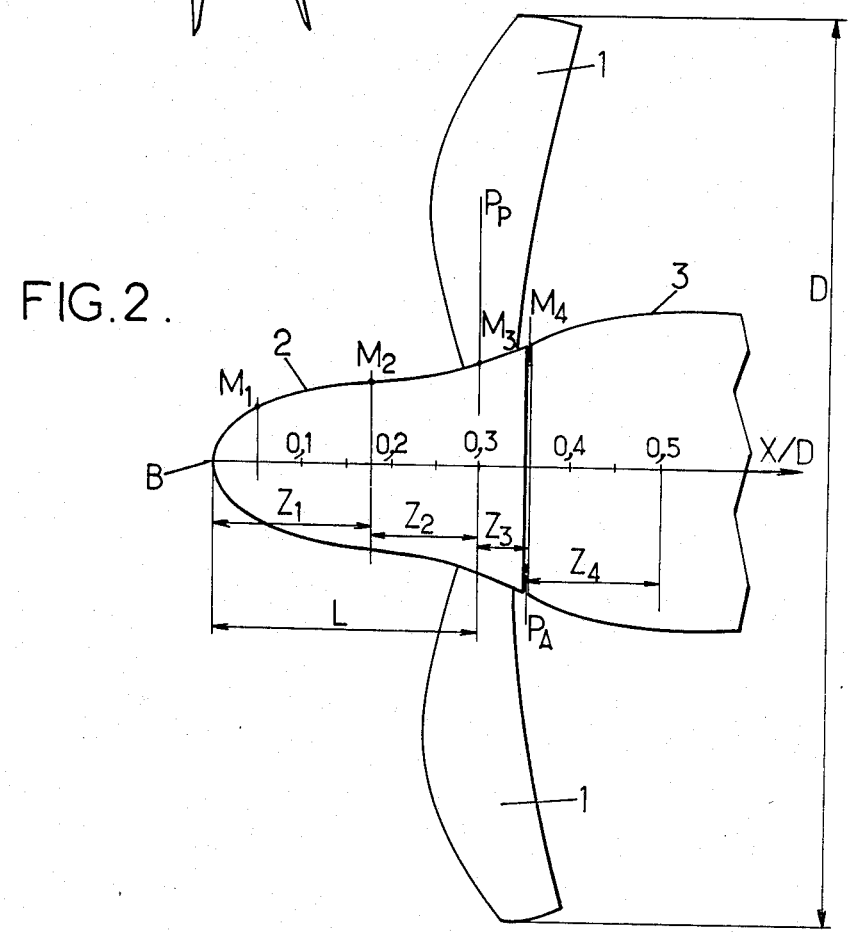

AERIAL PROPELLERS MORE ESPECIALLY FOR AIRCRAFT PROPULSIVE UNITS

The present invention relates to aerial propellers, particularly for aircraft propulsive units.

It is known that the theoretical efficiency of a propeller, for a given disk loading $C=P/D^2$ (P being the power on the propeller shaft and D the diameter), increases with the rotational speed of the propeller. But the adoption of a high rotational speed comes up against a problem: the composition of the speed due to rotation of the propeller and the advancing speed of the aircraft leads to relative MACH numbers which increase progressively from the base of the blade to its end. In these conventional propellers, the MACH number frequently reaches values of the order of 0.9 even when the advancing speeds are moderate, of the order of $M=0.6$. At these relative high Mach numbers there already appear, on thin conventional profiles, intense shock waves causing lamina separation and leading to high loss levels. Consequently, the propulsive efficiency of conventional propellers decreases rapidly, at a given propeller speed, when the speed of the aircraft increases, which leads to replacing propulsive units using propellers by other types of units, particularly by turbojets, when the speed of the aircraft exceeds about $M=0.65$.

Considerable work has already been carried out to try and increase the field of use of propellers towards much higher Mach numbers.

Propellers have been proposed such as the one shown (in a perspective view) in FIG. 1 of the accompanying drawings; this propeller includes a large number of blades 1 (with a number of blades generally greater than 8), projecting from a cowling 2, at a distance from the leading edge B of the cowling. This cowling 2 is joined to the engine nacelle (not shown), fixed against rotation.

The blades 1 of this propeller have a special shape in that their end is curved rearwardly, with regard to the direction of rotation of the propeller, and downstream, with respect to the plane of rotation of the propeller.

In propellers of this type, the flow in the blade portions (bases) the closest to the rotational axis of the propeller risks being blocked in the channels defined by the blades, such blocking causing considerable shocks reducing the theoretical efficiency of the propeller, with the risk of generating lamina separation on the blades and on the cowling. One of the aims of the invention is to slow down the flow locally at the base of the blades by using an appropriate form of cowling.

The cowling is defined as a body of revolution generated by the rotation of a meridian line about the axis of rotation of the propeller, this meridian line being referenced by its coordinates X and Y plotted on the axis of rotation of the propeller and on a radical axis and referenced to the diameter of the propeller, namely:

$$X = \frac{x}{D}$$

$$Y = \frac{r}{D}$$

x designating the abscissa, r the radius and D the diameter of the propeller.

This meridian line is characterized by its curvature C defined by:

$$\frac{1}{C} = \frac{[1 + (dY/dX)^2]^{3/2}}{d^2Y/dX^2}$$

The position of the blades with respect to the cowling is referenced by the distance L separating the leading edge of the cowling and the plane of the blades defined as being the plane perpendicular to the axis of rotation of the propeller and passing through its center.

The propeller of the invention comprises a plurality of blades leaving a cowling at a distance L from the leading edge of the cowling, said cowling being defined by a meridian line having:

at its origin, forming the leading edge of the cowling, a maximum curvature greater than 15, between its origin and a first relative abscissa point $X=x/D$ equals 0.05, a curvature decreasing rapidly from the maximum value to about a value of 7, between this first point and a second point situated at a distance from the leading edge between 0.5 and 0.7 times the leading edge—blade plane distance L, a curvature decreasing substantially linearly from a value 7 to a value 0, between this second point and a third point situated in the plane of the blades, a curvature decreasing more slowly than said linear decrease, from value 0 to a minimum value between $-3$ and $-5$, between this third point and a fourth point situated in the rear plane of the cowling, a curvature increasing rapidly from the minimum value to a value of 0.

Advantageously the engine nacelle which is joined to the cowling has a meridian line, extending that of the cowling, whose curvature increases from the value 0 to a value of about 3 at a relative distance of 0.10 to 0.15 downstream of the rear plane of the cowling, then decreases from value 3 to a value of about 1 at a relative distance of 0.40 to 0.45 downstream of the rear plane of the cowling.

The invention consists, apart from the arrangements already discussed, of several other arrangements which are preferably used at the same time and which will be described in greater detail hereafter.

The invention may in any case be better understood from the complement of description and the accompanying drawings, which complement and drawings relate to preferred embodiments of the invention and comprise no limitative character.

Figure 4:
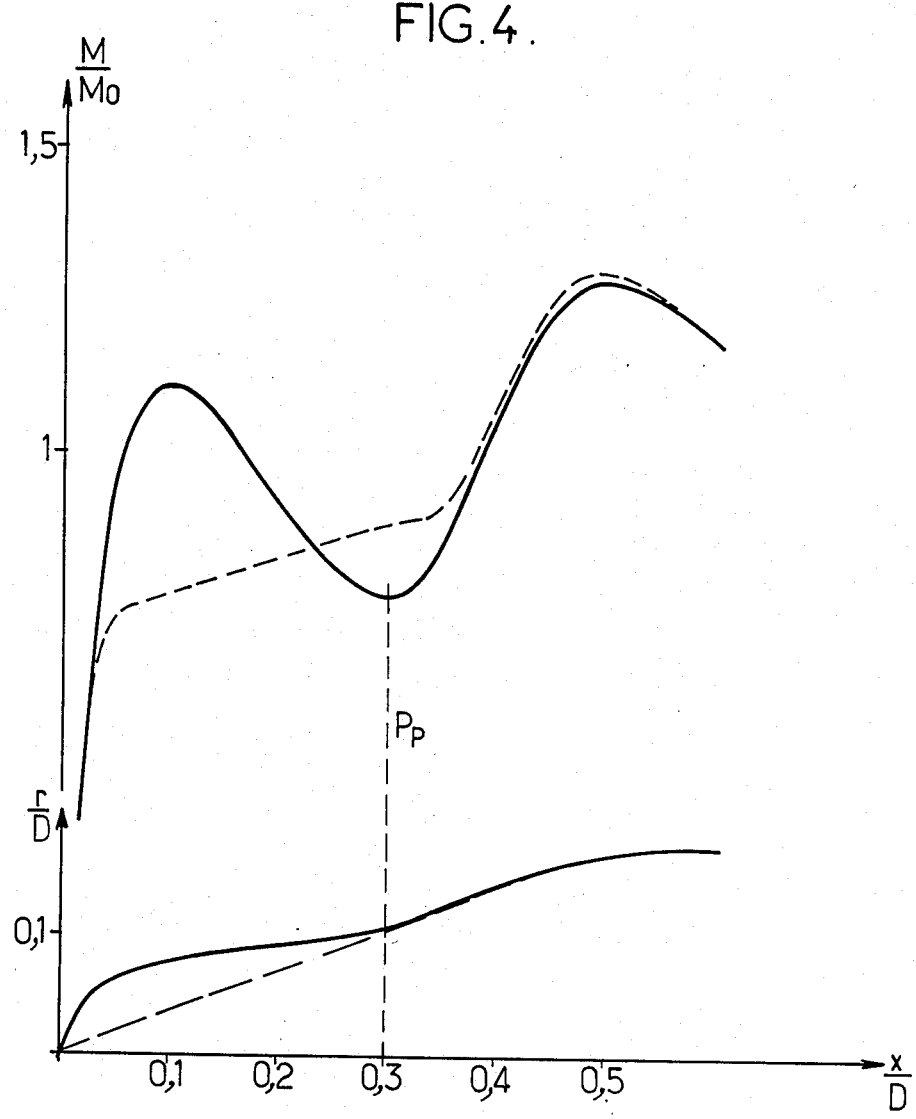

FIG. 1 is a perspective view of a propeller to which it is proposed to apply the improvements of the invention, FIG. 2 is a schematical view of a blade whose cowling is formed in accordance with the invention, FIG. 3 is a curve showing the evolution of the curvature of the cowling of the propeller shown in FIG. 2, FIG. 4 is a curve showing the results obtained with a conventional propeller and with a propeller whose cowling is formed in accordance with the invention.

Referring to the above defined system of coordinates and to FIGS. 2 and 3, the propeller of the invention has a plurality of blades 1 projecting from a cowling 2 at a distance L from the leading edge B of said cowling, said cowling being defined by a meridian line having:

at its origin O, forming the leading edge of the cowling, a maximum curvature greater than 15, between its origin O and a first point $M_1$ with relative abscissa $X=x/D$ equal to 0.05, a curvature decreasing rapidly from the maximum value to a value of about 7, between this first point $M_1$ and a second point $M_2$ situated at a distance $L_2$ from the leading edge between 0.5 and 0.7 times the leading edge—blade plane distance L, a curvature decreasing substantially linearly from the value 7 to a value 0, between this second point $M_2$ and a third point $M_3$ situated in a plane of the blades $P_P$, a curvature decreasing more slowly than said linear decrease, from the value 0 to a minimum value between $-3$ and $-5$, between this third point $M_3$ and a fourth point $M_4$ situated in the rear plane $P_A$ of the cowling, a curvature increasing rapidly from the minimum value to the value of 0.

The cowling has then:

a first zone $Z_1$, between the leading edge B and the second point $M_2$, in which the curvature decreases first of all fairly rapidly from its maximum value to a value of about 7, then decreases less rapidly, from a value of about 7 to its zero value, a second zone $Z_2$ between the second point $M_2$ and the plane of the blades $P_P$, in which the curvature is negative and decreases even more slowly to its minimum value, and a third zone $Z_3$, between the plane of the blades and the rear plane $P_A$ of the cowling, in which the curvature increases rapidly from its minimum value to a zero value.

The engine nacelle 3 which is joined to cowling 2 has a meridian line, extending that of the cowling, whose curvature increases from value 0 to a value of about 3 at a relative distance of 0.10 to 0.15 downstream of the rear plane of the cowling, then decreases from the value 3 to a value of about 1 at a relative distance of 0.40 to 0.45 downstream of the rear plane of the cowling.

The engine nacelle has then a zone, called fourth zone $Z_4$, extending the last zone $Z_3$ of the cowling whose curvature varies fairly rapidly following first of all an increase then a decrease.

This variant of the curvature of the meridian line forming the cowling of the propeller and the beginning of the engine nacelle is clearly shown in FIG. 3 in which the relative distances (X/D) reckoned along the axis of rotation of the propeller are plotted as abscissa and the curvature C as ordinates.

By way of example, the meridian line forming the cowling of the propeller and the beginning of the engine nacelle may be formed by the following curve sections, in the cartesian system X, Y in which $X=x/D$ and $Y=r/D$.

for $0 < X \leq 0.3$ $$Y = 0.3271995 X^{\frac{1}{2}} - 2.422616 X^2 + 5.697069 X^3$$

for $0.3 \leq X \leq 0.55$ $$Y = 2.996639 - 38.21174 X + 200.4801 X^2 - 538.7765 X^3 + 794.8556 X^4 - 615.5586 X^5 + 196.3246 X^6$$

Another example gives, for the cowling and the engine nacelle, the meridian line defined in the table below which takes up point by point the coordinates of this line in the same carthesian system X, Y, the notation $E \pm W$ signifying $10^{\pm W}$.

| X | Y |
|---|---|
| 0. | 0. |
| .1250000E−01 | .3621461E−01 |
| .2500000E−01 | .5030967E−01 |
| .3750000E−01 | .6025554E−01 |
| .5000000E−01 | .6781963E−01 |
| .6250000E−01 | .7372742E−01 |
| .7500000E−01 | .7838351E−01 |
| .8750000E−01 | .8205535E−01 |
| .1000000E+00 | .8494048E−01 |
| .1125000E+00 | .8719646E−01 |
| .1250000E+00 | .8895621E−01 |
| .1375000E+00 | .9033639E−01 |
| .1500000E+00 | .9144257E−01 |
| .1625000E+00 | .9237234E−01 |
| .1750000E+00 | .9321749E−01 |
| .1875000E+00 | .9406537E−01 |
| .2000000E+00 | .9499998E−01 |
| .2125000E+00 | .9610265E−01 |
| .2250000E+00 | .9745259E−01 |
| .2375000E+00 | .9912732E−01 |
| .2500000E+00 | .1012030E+00 |
| .2625000E+00 | .1037544E+00 |
| .2750000E+00 | .1068558E+00 |
| .2875000E+00 | .1105801E+00 |
| .3000000E+00 | .1150000E+00 |
| .3104167E+00 | .1192282E+00 |
| .3208333E+00 | .1237836E+00 |
| .3312500E+00 | .1284998E+00 |
| .3416667E+00 | .1332382E+00 |
| .3520833E+00 | .1378875E+00 |
| .3625000E+00 | .1423614E+00 |
| .3729167E+00 | .1465950E+00 |
| .3833333E+00 | .1505422E+00 |
| .3937500E+00 | .1541728E+00 |
| .4041667E+00 | .1574703E+00 |
| .4145833E+00 | .1604294E+00 |
| .4250000E+00 | .1630536E+00 |
| .4354167E+00 | .1653538E+00 |
| .4458333E+00 | .1673461E+00 |
| .4562500E+00 | .1690503E+00 |
| .4666667E+00 | .1704886E+00 |
| .4770833E+00 | .1716840E+00 |
| .4875000E+00 | .1726598E+00 |
| .4979167E+00 | .1734383E+00 |
| .5083333E+00 | .1740401E+00 |
| .5187500E+00 | .1744838E+00 |
| .5291667E+00 | .1747857E+00 |
| .5395833E+00 | .1749592E+00 |
| .5500000E+00 | .1750155E+00 |

In FIG. 4 a graph has been shown with the relative distances (x/D) reckoned along the axis of rotation of the propeller shown as abscissa and, at the lower part of the ordinate axis, the relative distances (r/D) reckoned in the plane of the blades as ordinates, and at the upper part of the axis of the ordinates, the relative Mach number (local Mach number/Mach number characterizing the speed) for a Mach number of 0.7.

The lower curves are the median lines of the cowling of the invention (continuous line) and of a conical conventional cowling (broken line).

The upper curves are the relative Mach variations in the case of a cowling of the invention (continuous line) and of a conical conventional cowling (broken line).

It can thus be seen that in the plane of the blades we have a substantial slowing down of the local Mach number, which contributes to avoiding the risk of blocking of the flow in the channels defined by the blades.

In so far as the different profiles are concerned which should be given to each blade associated with a cowling having the above characteristics, modern profiles may be used such as those usually established for transonic propellers.

Finally, and whatever the embodiment adopted, a propeller is obtained which may be used at high Mach numbers (greater than 0.65) and in which, because of the shape of the cowling, the phenomena of blocking of the flow in the channels defined by the blades at their bases are avoided. The efficiency of the propeller is therefore not diminished by shocks or lamina separation which such blocking phenomena risk causing.

What we claim is:

1. An aerial propeller, particularly for aircraft propulsive units, having a plurality of blades projecting from a cowling at a distance L from the leading edge of said cowling, wherein said cowling is defined by a meridian line having:
   at its origin, forming the leading edge of the cowling, a maximum curvature greater than 15,
   between its origin and a first relative abscissa point $X=x/D$ equals 0.05, a curvature decreasing rapidly from the maximum value to about a value of 7,
   between said first point and a second point situated at a distance from the leading edge between 0.5 and 0.7 times the leading edge—blade plane distance L, a curvature decreasing substantially linearly from a value 7 to a value 0,
   between said second point and a third point situated in the plane of the blades, a curvature decreasing more slowly than said linear decrease, from value 0 to a minimum value between $-3$ and $-5$,
   between said third point and a fourth point situated in the rear plane of the cowling, a curvature increasing rapidly from the minimum value to a value of 0.

2. A propeller according to claim 1, in which an engine nacelle is joined to the cowling wherein said engine nacelle has a meridian line extending that of the cowling whose curvature increases from the value 0 to a value of about 3 at a relative distance of 0.10 to 0.15 downstream of the rear plane of the cowling, then decreases from value 3 to a value of about 1 at a relative distance of 0.40 to 0.45 downstream of the rear plane of the cowling.

3. A propeller according to claim 1 in which the cowling is formed by a meridian line, wherein said meridian line is formed by two curve sections having, in the cartesian system X, Y in which $X=x/D$ and $Y=r/D$, the following equations,
   the first section, for $0<X\leq0.3$, $$Y=0.3271995X^{\frac{1}{2}}-2.422616X^2+5.697069X^3$$

the second section, for $0.3\leq X\leq 0.55$, $$Y=2.996639-38.21174X+200.4801X^2-538.7765X^3+794.8556X^4-615.5586X^5+196.3246X^6.$$

4. A propeller according to claim 1 in which the cowling is formed by a meridian line wherein said meridian line is defined by the following dimensions:

| X | Y |
| --- | --- |
| 0. | 0. |
| .1250000E−01 | .3621461E−01 |
| .2500000E−01 | .5030967E−01 |
| .3750000E−01 | .6025554E−01 |
| .5000000E−01 | .6781963E−01 |
| .6250000E−01 | .7372742E−01 |
| .7500000E−01 | .7838351E−01 |
| .8750000E−01 | .8205535E−01 |
| .1000000E+00 | .8494048E−01 |
| .1125000E+00 | .8719646E−01 |
| .1250000E+00 | .8895621E−01 |
| .1375000E+00 | .9033639E−01 |
| .1500000E+00 | .9144257E−01 |
| .1625000E+00 | .9237234E−01 |
| .1750000E+00 | .9321749E−01 |
| .1875000E+00 | .9406537E−01 |
| .2000000E+00 | .9499998E−01 |
| .2125000E+00 | .9610265E−01 |
| .2250000E+00 | .9745259E−01 |
| .2375000E+00 | .9912732E−01 |
| .2500000E+00 | .1012030E+00 |
| .2625000E+00 | .1037544E+00 |
| .2750000E+00 | .1068558E+00 |
| .2875000E+00 | .1105801E+00 |
| .3000000E+00 | .1150000E+00 |
| .3104167E+00 | .1192282E+00 |
| .3208333E+00 | .1237836E+00 |
| .3312500E+00 | .1284998E+00 |
| .3416667E+00 | .1332382E+00 |
| .3520833E+00 | .1378875E+00 |
| .3625000E+00 | .1423614E+00 |
| .3729167E+00 | .1465950E+00 |
| .3833333E+00 | .1505422E+00 |
| .3937500E+00 | .1541728E+00 |
| .4041667E+00 | .1574703E+00 |
| .4145833E+00 | .1604294E+00 |
| .4250000E+00 | .1630536E+00 |
| .4354167E+00 | .1653538E+00 |
| .4458333E+00 | .1673461E+00 |
| .4562500E+00 | .1690503E+00 |
| .4666667E+00 | .1704886E+00 |
| .4770833E+00 | .1716840E+00 |
| .4875000E+00 | .1726598E+00 |
| .4979167E+00 | .1734383E+00 |
| .5083333E+00 | .1740401E+00 |
| .5187500E+00 | .1744838E+00 |
| .5291667E+00 | .1747857E+00 |
| .5395833E+00 | .1749592E+00 |
| .5500000E+00 | .1750155E+00 |

* * * * *